United States Patent
Brüggen et al.

(10) Patent No.: US 8,118,648 B2
(45) Date of Patent: Feb. 21, 2012

(54) AIR INFEED DEVICE FOR AIR-CONDITIONING PASSENGER AREAS IN AIRCRAFT

(75) Inventors: Lars Brüggen, Hamburg (DE); Matthias Kobler, Blaustein (DE); Jörg Stützer, Burgrieden (DE)

(73) Assignee: Airbus Deutschland GmbH, Hamburg (DE)

( * ) Notice: Subject to any disclaimer, the term of this patent is extended or adjusted under 35 U.S.C. 154(b) by 849 days.

(21) Appl. No.: 12/109,706

(22) Filed: Apr. 25, 2008

(65) Prior Publication Data

US 2008/0268762 A1  Oct. 30, 2008

Related U.S. Application Data

(60) Provisional application No. 60/913,896, filed on Apr. 25, 2007.

(30) Foreign Application Priority Data

Apr. 25, 2007  (DE) .................. 10 2007 019 539

(51) Int. Cl.
  *B64D 13/00* (2006.01)
(52) U.S. Cl. ...................................... 454/76
(58) Field of Classification Search ............ 454/76, 454/71, 72, 73, 74, 152, 153, 154, 155, 284, 454/305, 292, 299, 69, 121, 127
See application file for complete search history.

(56) References Cited

U.S. PATENT DOCUMENTS

| 2,152,338 | A | * | 3/1939 | Will ........................ 454/127 |
| 3,724,357 | A | * | 4/1973 | Kavthekar et al. ........... 454/152 |
| 5,556,332 | A | * | 9/1996 | Schumacher .................. 454/76 |
| 6,073,987 | A | * | 6/2000 | Lindberg et al. ............. 296/70 |
| 6,413,159 | B1 | * | 7/2002 | Bates et al. .................... 454/76 |
| 6,450,876 | B2 | * | 9/2002 | Elliot ........................... 454/121 |
| 6,752,712 | B1 | | 6/2004 | Short et al. |
| 6,843,716 | B2 | * | 1/2005 | Butera et al. ................. 454/121 |
| 2002/0160706 | A1 | | 10/2002 | Elliot et al. |
| 2005/0130579 | A1 | * | 6/2005 | Butera et al. ................. 454/121 |
| 2005/0230488 | A1 | * | 10/2005 | Markwart et al. ............. 237/10 |

FOREIGN PATENT DOCUMENTS

DE  4000732 A  *  7/1991
EP  1659011     5/2006

* cited by examiner

*Primary Examiner* — Steven B McAllister
*Assistant Examiner* — Brittany E Towns
(74) *Attorney, Agent, or Firm* — Wood, Herron & Evans, LLP

(57) ABSTRACT

An air infeed device for air-conditioning passenger areas in aircraft includes a central air infeed module for the centrally regulated cabin ventilation system and an individual air infeed module for the individually adjustable cabin ventilation system. The centrally regulated cabin ventilation system and the individually adjustable cabin ventilation system are mutually independent systems. The central air infeed module and the individual air infeed module are connected to form a subassembly that can be handled independently as a collective unit.

16 Claims, 3 Drawing Sheets

AIR INFEED DEVICE FOR AIR-CONDITIONING PASSENGER AREAS IN AIRCRAFT

TECHNICAL FIELD

The invention relates to an air infeed device for air-conditioning passenger areas in aircraft. This device has a central air infeed module for the centrally regulated cabin ventilation and an individual air infeed module for the ventilation which can be adjusted individually by the passenger. It also relates to an air infeed installation having an air infeed device of this kind.

BACKGROUND

As a rule, commercial aircraft have an air infeed installation with two mutually independent air infeed systems for air-conditioning the passenger cabin. A central air infeed system which is regulated centrally, for example via the cockpit, serves, above all, for that continuous infeed of fresh air which is necessary because of the large passenger density in an aircraft cabin. Air outlet apertures belonging to the central air infeed system may be disposed both in the foot area of the aircraft's passenger cabin and also in the region of the stowage lockers for luggage which are located above the rows of seats. Apart from this, there is an additional, individually adjustable air infeed system for each individual seating place, which system is connected to so-called "passenger nozzles". These are located above the passenger seats and can be adjusted individually by each passenger as regards the air flow and direction of flow.

The air-conditioning air to be fed to the aircraft's passenger cabin is cooled or heated and dehumidified in a special unit and passes from the latter, via an air-distributor system, to the two air infeed systems which comprise duct or pipe systems which are constructed so as to be separate from one another. The duct system or pipe system of the individual air infeed system which is used for the individually adjustable infeed of air normally has a smaller cross-section than the duct system or pipe system of the central air infeed system which serves for the centrally regulated ventilation of the passenger cabin.

One problem of separate air infeed systems of this kind lies in their multipart nature, which represents a higher expenditure when fitting is carried out. Thus, it is necessary to fit both the corresponding modules for the individually adjustable infeed of air, and the respective modules for the central infeed of air for cabin ventilation, as separate units in a number of fitting steps. Furthermore, the air infeed systems which have been installed separately and are mutually independent each have to be provided with their own secondary insulation in order to maintain the air temperature of the air-conditioned air within the air infeed system.

A further problem consists in the fact that the two air infeed systems with their separate duct systems take up a relatively large installation space because of the geometry of the individual components. This restricts the installation space available within the aircraft's fuselage for other components. In addition to this, as a result of the restrictions on installation space which exist within the aircraft's fuselage, the individual air infeed elements have to be constructed with small duct cross-sections, and this leads to losses of pressure in the ducts of the air infeed systems. It is therefore usually necessary to generate an additional initial air pressure in order to ensure adequate ventilation of the aircraft's passenger cabin.

The underlying object of the present invention is to make available an air infeed device, and also an air infeed system for air-conditioning passenger areas in aircraft, which is of compact construction and simple to fit.

SUMMARY OF THE INVENTION

This object is achieved by means of an air infeed device having the features described below, and also by means of an air infeed installation which is configured with an air infeed device of this kind.

The air infeed device according to the invention has a central air infeed module for the centrally regulated cabin ventilation and an individual air infeed module for the individual, adjustable cabin ventilation. The central air infeed module thus forms part of a centrally regulated air infeed system, while the individual air infeed module forms part of an individual air infeed system belonging to the aircraft and can be connected, for example, to a "passenger nozzle". The central air infeed module and the individual air infeed module can be constructed as separate modules or in a manner integrated with one another. The essential point is that the central air infeed module and the individual air infeed module are connected, even before they are fitted in the interior of the aircraft, to form a subassembly that can be handled independently. This substantially simplifies fitting in the interior of the aircraft since it is not necessary to have one fastening device each for a module belonging to the central air infeed system and a module belonging to the individual air infeed system, but henceforth only one fastening device for the entire preassembled subassembly. Furthermore, preassembly of the components reduces the number of fitting steps needed for fitting the air infeed device, and thus shortens the fitting time.

The secondary insulation for screening-off the air infeed device thermally from its environment is attached to the preassembled subassembly, which has a reduced surface, compared to the system which is known from the prior art. In addition to savings in terms of material costs, this also results in a shortened fitting time, since it is no longer necessary to insulate two separate systems, but merely one consolidated system. In addition, it is possible to achieve a compact mode of construction by configuring the air infeed device in accordance with the invention.

One further development of the invention makes provision for the central air infeed module to have, viewed in the direction of a longitudinal axis of the air infeed device, an essentially C-shaped cross-section and also an essentially concave front side and is an essentially convex rear side. This special structural shape of the central infeed module allows particularly space-saving installation of the module within the interior of the aircraft. In particular, it is possible to make optimum use of an intervening space which is present between a luggage locker and a rib, because of the shape of the central air infeed module, which shape is adapted to the outer contour of said luggage locker.

Provision may also be made for the central air infeed module to possess a base member having at least one aperture which is constructed in its superficies and is connected to an air inlet pipe. The base member and the air inlet pipe connected to it may jointly form the C-shaped cross-section of the central air infeed module, since both of them preferably possess a corresponding curvature in their cross-section, viewed in the direction of the longitudinal axis of the air infeed device. Air-conditioning air can be fed from an air-distributing system into the bases member of the central air infeed module via the air inlet pipe.

The base member preferably encloses a cavity, the superficies of said base member having a slit-shaped air outlet aperture. The air-conditioning air fed in via the air inlet pipe can be delivered into the passenger area via this aperture. The cavity may also have, viewed in the direction of the longitudinal axis of the air infeed device, a cross-section which possesses a widened section and also a tapering section. The air distribution is thereby improved in terms of fluidics, so that an additional initial air pressure for ensuring adequate ventilation of the aircraft's passenger cabin can at least be reduced.

In a preferred variant of embodiment of the invention, provision may be made for each air inlet pipe to have a larger cross-section at the point of connection to the base member than at its free end.

Furthermore, provision may be made for each air inlet pipe to be disposed, in the direction of the longitudinal axis of the air infeed device, on both sides at an essentially equal distance from another air inlet pipe or from one of the two end edges of the central air infeed module. These two design measures also improve the air distribution, starting out from the air inlet pipe in the cavity of the base member, and guarantee uniform distribution of the air fed in, within said cavity, and thereby uniform delivery of said air to the air outlet aperture.

One further development of the invention makes provision for the base member of the central air infeed module to have at least one depression on the concave front side of said central air infeed module and therefore on its own front side. Alternative or additional depressions on other surfaces, for example the lateral faces of the base member, or on the air inlet pipe are also possible.

Provision may also be made for each depression to have an essentially triangular shape, a base side of the triangle extending in the same direction as the slit-shaped aperture and a point of said triangle pointing in the direction of an air inlet pipe. In conjunction with the abovementioned design features of the central air infeed module, a depression constructed in the base member of said central air infeed module guarantees improved air distribution within the latter. It serves, in particular, as a guide face for the air flowing through said module and ensures that an air flow that flows out in a uniform manner is guaranteed, not only in a central region of the air outlet aperture but also in its edge regions.

Another form of embodiment of the invention makes provision for the base member of the central air infeed module to have, on the convex rear side, a depression, which extends in the direction of the longitudinal axis of the air infeed device, for receiving the corresponding individual air infeed module. Since said individual air infeed module is then partially received in the central air infeed module, the said depression further reduces the construction space necessary for the subassembly of the air infeed device. In the case of this further development of the invention, moreover, it is possible to save on further material for the secondary insulation as a result of the reduced external surface.

A further development of the invention makes provision for the individual air infeed module to possess an essentially hose-shaped base member having at least one aperture which is constructed on its superficies and is connected to at least one pair of air outlet pipes. The hose-like shape of the base member permits uniform air distribution and simple fitting into the depression located on the central air infeed module for receiving the individual air infeed module. The air outlet pipes disposed in pairs can be connected, for example, to individually adjustable "passenger nozzles" provided above each passenger seat. As an alternative to the air outlet pipes disposed in pairs, it is also possible to provide individual air outlet pipes or air outlet pipes in a different grouping, for example in groups of three.

A further aperture, which can be connected to an air inlet pipe, may also be constructed in the superficies of the base member of the individual air infeed module. The air inlet pipe that can be connected to the individual air infeed module may, for example, be shaped in such a way that it is adapted to the outer shape of the central air infeed module which is connected to said individual air infeed module.

A further refinement of the invention makes provision for the base member of the individual air infeed module to have, at least one free end, an aperture and attachment means for attachment to a corresponding base member of another individual air infeed module. In this way it is possible to connect a number of individual air infeed modules to one another. In a form of embodiment of this kind, it may be appropriate, depending upon the dimensioning of the individual air infeed system (length of the individual air infeed modules connected to one another and cross-section of the base member of said individual air infeed modules) not to locate an air inlet pipe at each aperture in a base member of the individual air infeed modules, but merely, for example, at every third base member of those base members of the individual air infeed modules which are connected to one another. In a form of embodiment of this kind, the apertures which are not connected to an air inlet pipe are occluded by means of an occluding means, for example in the form of an occluding plug or the like, so that the pressure within the individual air infeed modules which are connected to one another is equal, and no discharges of air are formed, other than via the air outlet pipes.

For the purpose of connecting the modules of the central air infeed and the individual air infeed, a further development of the invention makes provision for a central air infeed module to be connected to an individual air infeed module by means of at least one additional fastening element. In this case, possible fastening elements would be, for example, cable ties, clamps, clips and the like.

Another form of embodiment of the invention makes provision for a central air infeed module to be connected, in each case, to an individual air infeed module by means of a firmly-bonded mutual joining connection. This may be an adhesive connection, a soldered connection or even a welded connection, depending upon the particular material which is chosen for the modules. For example, it is also possible to join said modules beforehand by means of a firmly-bonded joining connection, and to additionally secure them via a fastening element. In addition, it is also possible, alternatively, to construct the central air infeed module and the individual air infeed module in an integrated manner, i.e. as just one component.

Another variant of embodiment of the invention makes provision for the modules to be manufactured from plastic or a composite material, such as glass fibre-reinforced plastic. This is appropriate, particularly with regard to the general specification of the aircraft industry that each component should possess the lowest possible weight in view of subsequent operating costs.

BRIEF DESCRIPTION OF THE DRAWINGS

An exemplified embodiment of the invention will be explained below with reference to the appended diagrammatic drawings, in which.

DETAILED DESCRIPTION

Figure 1:
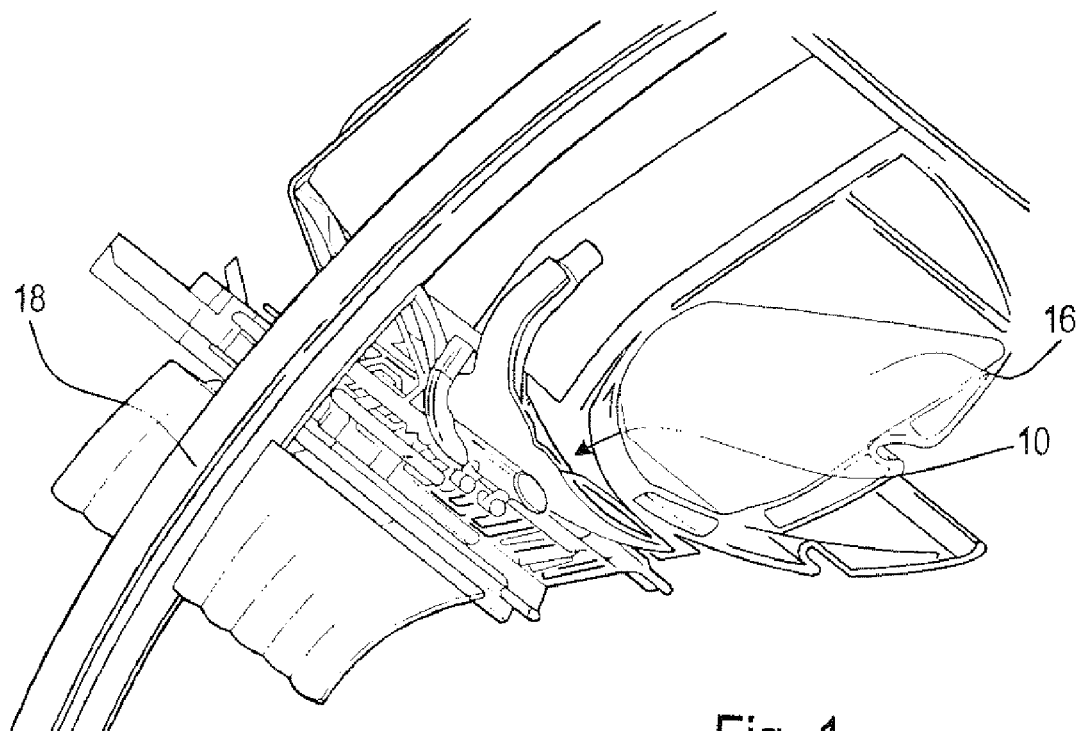
FIG. 1 represents a perspective view of one form of embodiment of the air infeed device according to the invention, in the installed state.
Figure 2:
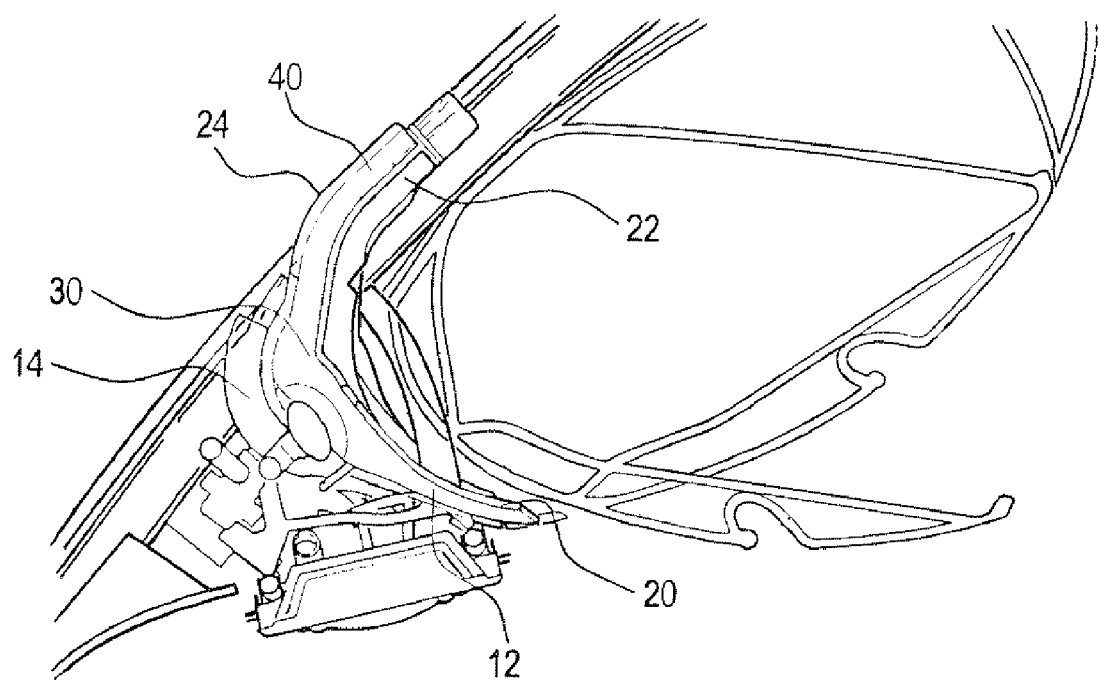
FIG. 2 represents a side view of the air infeed device according to the invention as illustrated in FIG. 1.

An air infeed device 10 according to the invention can be seen in the installed condition in FIGS. 1 and 2. A luggage locker 16 is located above said air infeed device 10, the rearward termination being formed by a rib 18. As can also be seen with the aid of FIGS. 3 to 6, said air infeed device 10 has a central air infeed module 12 for the centrally regulated cabin ventilation, and an individual air infeed module 14 for the individually adjustable ventilation. As previously described, the central air infeed module 12 and the individual air infeed module 14 are fluidically uncoupled (i.e., the respective duct systems are separate from one another). In that form of embodiment of the air infeed device 10 according to the invention which is shown, the individual air infeed module 14 is received in a depression 28 which is located on the convex rear side 24 of the central air infeed module 12.

It clearly emerges from FIGS. 1 and 2 that, viewed in the direction of a longitudinal axis L1 of the device 10, the central air infeed module 12 possesses an essentially C-shaped cross-section 20. Its concave front side 22 is constructed in such a way that said central air infeed module 12 can be applied against the outer contour of the luggage locker 16 in the optimum manner. If said luggage locker 16 has a different outer contour, or if it is desired to apply it against another component, the shape of the central air infeed module 12 can be adapted accordingly.

The central air infeed module 12 possesses a base member 30 having at least one aperture which is constructed in its superficies and is connected to an air inlet pipe 40. The cross-section of the base member 30 and the cross-section of the air inlet pipe 40 are shaped in such a way, viewed in the direction of a longitudinal axis L1 of the device 10, that they jointly form the C-shaped cross-section 20 for adaptation to the adjoining module in the form of the luggage locker 16. In the form of embodiment represented, the air inlet pipe 40 is disposed, viewed in the direction of a longitudinal axis L1 of the device 10, at equal distances d from the two end edges 42 of the central air infeed module 12. In another possible form of embodiment having more than one air inlet pipe 40 and corresponding apertures constructed on the superficies of the base member 30, the distances d in the direction of the longitudinal axis L1 would be essentially the same size, both between the individual air inlet pipes 40 and between an end edge 42 of the central air infeed module 12 and an air inlet pipe 40.

At its point of attachment to the base member 30 of the central air infeed module 12, the cross-section of the air inlet pipe 40 is enlarged compared to its cross-section at its free end. The basis for an improved air infeed to the end edges 42 of the central air infeed module 12 is thereby laid already at the air inlet pipe 40.

Figure 3:
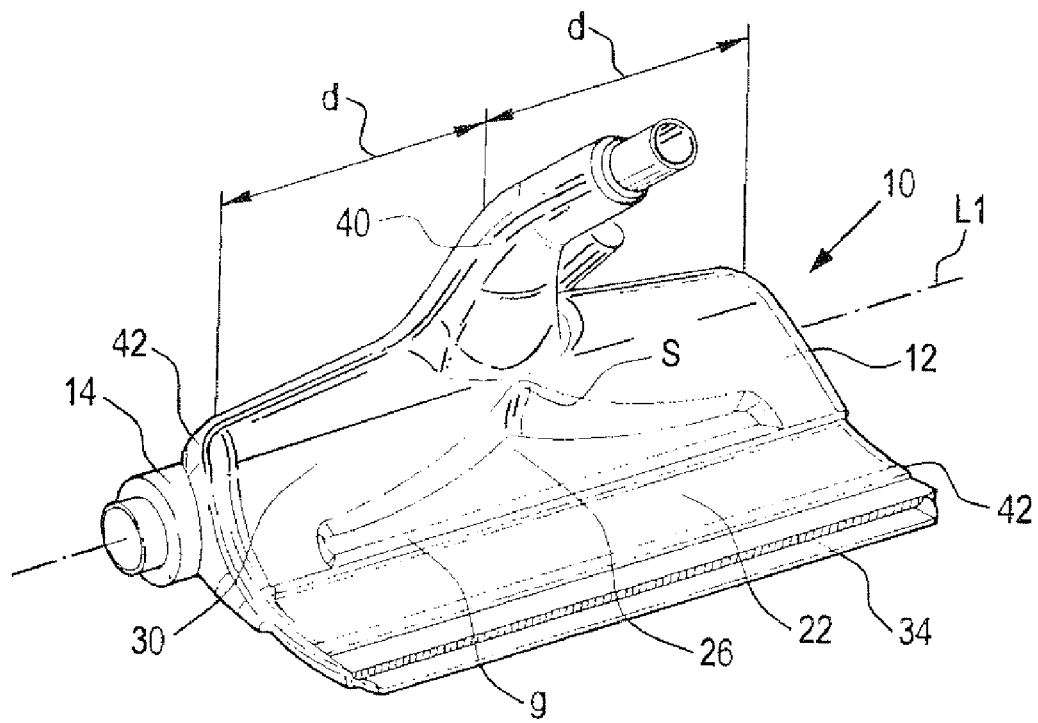
FIG. 3 represents an individual representation, in perspective, of the air infeed device according to the invention as illustrated in FIG. 1.

As can best be seen from FIG. 3, the base member 30 of the central air infeed is module 12 encloses a cavity 32 which has a slit-shaped air outlet aperture 34 at its superficies. Said cavity 32 possesses, in the region of the air inlet pipe 40, a larger cross-section which tapers to a greater and greater extent in the direction of the said slit-shaped air outlet aperture 34. In this way, the air flowing in via the air inlet pipe 40 is distributed within the cavity 32 and delivered via the slit-shaped air outlet aperture 34 without high losses in pressure.

In order to further improve the air distribution within the cavity 32 of the base member 30 of the central air infeed module 12, an essentially triangular depression 26 is located on its concave front side 22. A base side g of the triangle is disposed parallel to the slit-shaped air outlet aperture 34, while an oppositely located point S of the triangle points towards the air inlet pipe 40. The said depression 26 forms a guide face along which the air flowing in flows within the cavity 32, and serves, above all, to supply the lateral regions of said cavity 32 at the end edges 42 with sufficient air to ensure a uniform delivery of air along the slit-shaped air outlet aperture 34.

Alternatively, the location of a number of depressions of this kind on a central air infeed module 12 having only one air inlet pipe 40 is just as possible as on a central air infeed module 12 having more than one air inlet pipe 40. Under these circumstances, the point(s) S of the depression(s) 26 may, alternatively, also be aligned on a central axis of the device 10 which is perpendicular to the longitudinal axis L1, or on an air inlet pipe 40 or on different air inlet pipes 40. As an alternative to this, the depressions may also be located in another shape and/or on other faces, such as the lateral faces of the base member 30 or on an air inlet pipe 40.

Figure 4:
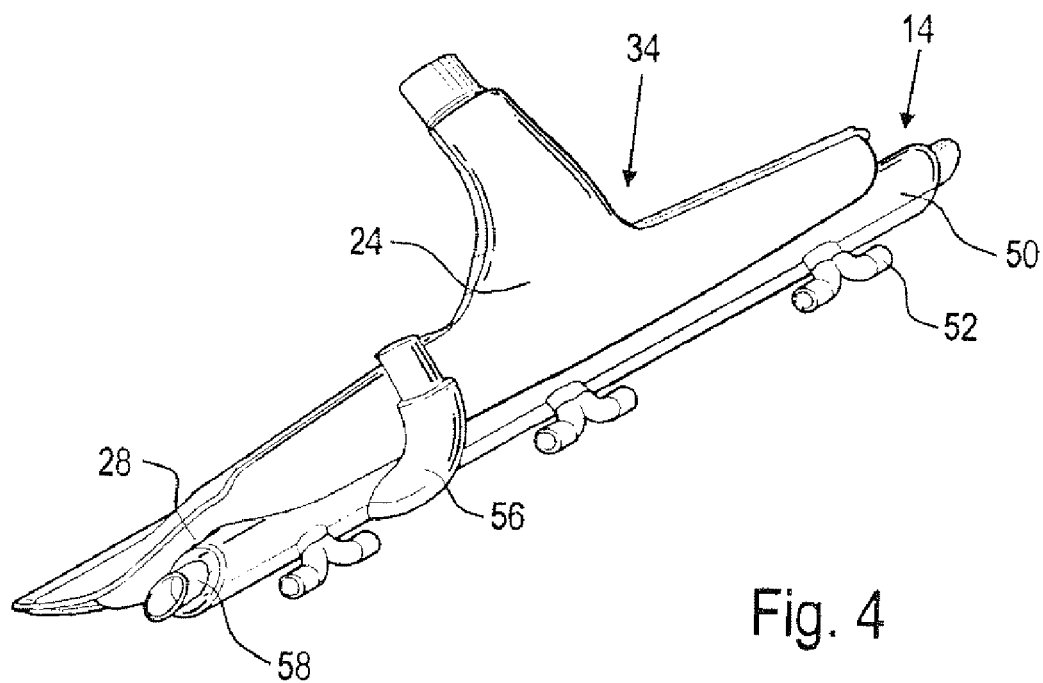
FIG. 4 represents a perspective view of the air infeed device according to the invention in an individual representation as illustrated in FIG. 3, said device being rotated by 180° about a vertical axis.
Figure 5:
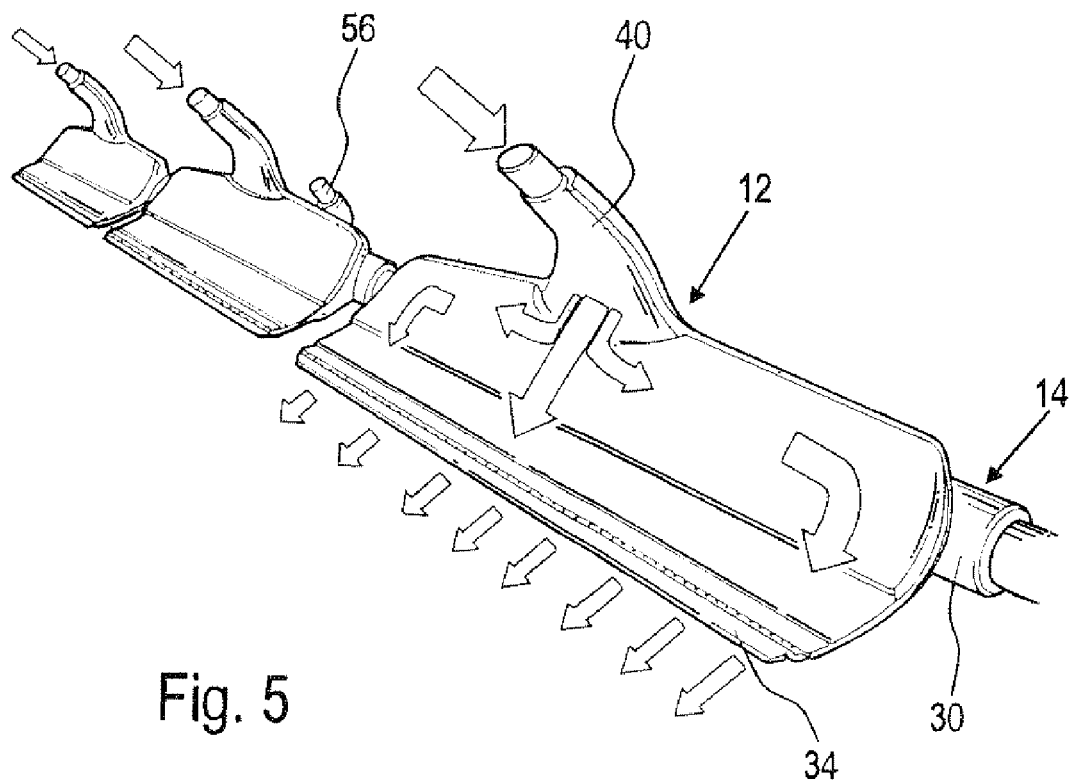
FIG. 5 represents a perspective view of a number of air infeed devices according to the invention as illustrated in FIG. 4, in the assembled state.
Figure 6:
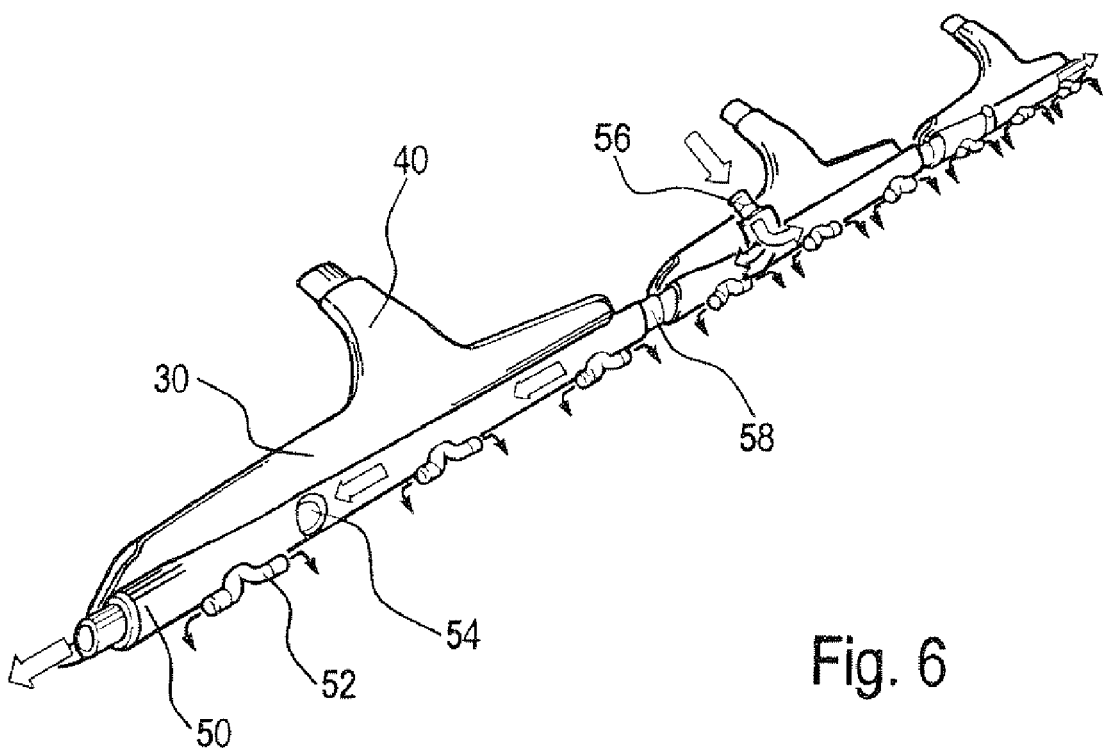
FIG. 6 represents a perspective view of a number of air infeed devices according to the invention as illustrated in FIG. 5, the arrangement being rotated by 180° about a vertical axis.

FIGS. 4 and 6 show a perspective view of the air infeed device 10, looking towards the convex rear side 24. The individual air infeed module 14 received in the depression 28 constructed on the central air infeed module 12 has an essentially hose-shaped base member 50 which possesses three apertures which are constructed in its superficies and are connected to a pair of air outlet pipes 52 in each case. The air outlet pipes 52, which are disposed in pairs, each comprise two pipes which are bent by about 90° and are disposed so as to face away from one another in a T-shaped manner in the direction of the longitudinal axis L1.

Furthermore, there is constructed in the superficies of the base member 50 of the individual air infeed module 14, a further aperture 54 which can be connected to an air inlet pipe 56. Said air inlet pipe 56 has, in a manner similar to the air inlet pipe 40 belonging to the central air infeed module 12, a curvature by means of which it can be applied against the convex rear side 24 of the base member 30 of said central air infeed module 12.

In FIG. 6, the base members 50 of three individual air infeed modules 14 are connected to one another via an aperture at their free ends by means of means of attachment 58, for example in the form of clamps. In this case, however, only one individual air infeed module 14 has an air inlet pipe 56 which is connected to its aperture 54 which is constructed on the base member 50. It may be simpler and more favourable, depending upon the method of manufacture, to construct the base members 50 of the individual air infeed modules 14 as identical parts having an aperture 54, irrespective of whether, in the installed state, an air inlet pipe 56 is subsequently to be attached to them or not. If they are not connected to an air inlet pipe 56, the remaining apertures 54 may be occluded by means of an occluding means, for example a plug or the like, in order to maintain the needed air pressure within the individual air infeed system and to permit no further discharges of air, other than via the air outlet pipes 52.

It is also optionally possible to construct, in the superficies of the base member 50 of the individual air infeed module 14, a number of apertures 54 which can be connected to an air inlet pipe 56.

In that form of embodiment of the air infeed device 10 which is shown in the drawings, a central air infeed module 12 is connected to an individual air infeed module 14. However, it is also possible to connect a number of individual air infeed modules 14 to one central air infeed module 12, or to connect a number of central air infeed modules 12 to one individual air infeed module 14.

The connection of the central air infeed module 12 to the individual air infeed module 14 takes place via an additional fastening element of which no further details are illustrated in the drawings. As an alternative to this, a firmly-bonded joining connection, or a combination consisting of a fastening element and a firmly-bonded joining connection, is also possible. In this case, various firmly-bonded joining connections suggest themselves, depending upon the material of the modules 12, 14, such as adhesion, welding or soldering for example, while undoable and non-undoable connecting elements, such as encompassing clamps, cable ties, clips or the like, are possible as the fastening elements. The modules 12, 14 may be manufactured from plastic or a composite material, such as glass fibre-reinforced plastic.

The invention claimed is:

1. An air infeed device for air-conditioning passenger areas in aircraft, comprising:
    a central air infeed module for a centrally regulated cabin ventilation system, the central air infeed module including a base member having a C-shaped cross section as viewed in the direction of a longitudinal axis of the air infeed device and also including an essentially concave front side and an essentially convex rear side; and
    an individual air infeed module for an individually adjustable cabin ventilation system which is a mutually independent system from the centrally regulated cabin ventilation system, the individual air infeed module being fluidically uncoupled from the central air infeed module within the air infeed device,
    wherein the central air infeed module and the individual air infeed module are connected to form a subassembly that can be handled independently as a collective unit, and
    wherein the base member of the central air infeed module includes a depression on the convex rear side which extends in the longitudinal direction, the depression receiving the corresponding individual air infeed module.

2. The air infeed device of claim 1, wherein the base member includes at least one aperture which is positioned in its superficies and is connected to an air inlet pipe.

3. The air infeed device of claim 2, wherein the base member encloses a cavity and the superficies of said base member include a slit-shaped air outlet aperture.

4. The air infeed device of claim 3, wherein the cavity includes a cross-section which has a widened section and also a tapering section as viewed in the direction of the longitudinal axis of the air infeed device.

5. The air infeed device of claim 2, wherein each air inlet pipe has a larger cross-section at the point of connection to the base member than at an opposing free end.

6. The air infeed device of claim 2, wherein each air inlet pipe is disposed, in the direction of the longitudinal axis of the air infeed device, on both sides at an essentially equal distance from another air inlet pipe or from one of two end edges of the central air infeed module.

7. The air infeed device of claim 3, wherein the base member of the central air infeed module includes at least one depression on the concave front side.

8. The air infeed device of claim 7, wherein each depression on the concave front side has an essentially triangular shape, a base side of the triangular shape extending in the same direction as the slit-shaped outlet aperture and a point of the triangular shape pointing in the direction of an air inlet pipe.

9. The air infeed device of claim 1, wherein the individual air infeed module includes an essentially hose-shaped base member having at least one aperture which is constructed in its superficies and is connected to at least one pair of air outlet pipes.

10. The air infeed device of claim 9, wherein a further aperture, which can be connected to an air inlet pipe, is provided in the superficies of the base member of the individual air infeed module.

11. The air infeed device of claim 9, wherein the base member of the individual air infeed module includes an aperture and attachment means at a free end for attachment to a corresponding base member of another individual air infeed module.

12. The air infeed device of claim 1, wherein one central air infeed module is connected to an individual air infeed module by at least one additional fastening element.

13. The air infeed device of claim 1, wherein one central air infeed module is connected to an individual air infeed module by a firmly-bonded joining connection.

14. The air infeed device of claim 1, wherein the modules are manufactured from plastic or a composite material.

15. Air infeed installation having the air infeed device according to claim 1.

16. An aircraft comprising:
    at least one passenger area; and
    an air infeed device including:
        a central air infeed module for a centrally regulated cabin ventilation system, the central air infeed module including a base member having a C-shaped cross section as viewed in the direction of a longitudinal axis of the air infeed device and also including an essentially concave front side and an essentially convex rear side; and
        an individual air infeed module for an individually adjustable cabin ventilation system which is a mutually independent system from the centrally regulated cabin ventilation system, the individual air infeed module being fluidically uncoupled from the central air infeed module within the air feed device,
        wherein the central air infeed module and the individual air infeed module are connected to form i a subassembly that can be handled independently as a collective unit, and
        wherein the base member of the central air infeed module includes a depression on the convex rear side which extends in the longitudinal direction, the depression receiving the corresponding individual air infeed module.

* * * * *